United States Patent
Tang et al.

(10) Patent No.: US 11,101,952 B2
(45) Date of Patent: Aug. 24, 2021

(54) METHOD AND APPARATUS FOR MAPPING REFERENCE SIGNAL

(71) Applicant: Huawei Technologies Co., Ltd., Shenzhen (CN)

(72) Inventors: Hao Tang, Shanghai (CN); Yongzhao Cao, Shanghai (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 16/364,602

(22) Filed: Mar. 26, 2019

(65) Prior Publication Data

US 2019/0222382 A1 Jul. 18, 2019

Related U.S. Application Data

(63) Continuation of application No. PCT/CN2017/103869, filed on Sep. 28, 2017.

(30) Foreign Application Priority Data

Sep. 29, 2016 (CN) .......................... 201610864634.0

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/2615* (2013.01); *H04L 5/005* (2013.01);
(Continued)

(58) Field of Classification Search
None
See application file for complete search history.

(56) References Cited

U.S. PATENT DOCUMENTS

2009/0074086 A1* 3/2009 Murakami ............ H04L 27/265
375/260
2010/0002757 A1 1/2010 Birru et al.
(Continued)

FOREIGN PATENT DOCUMENTS

CN 101212440 A 7/2008
CN 101595704 A 12/2009
(Continued)

OTHER PUBLICATIONS

"Reference symbols types in NR," 3GPP TSG-RAN WG1 #86, Gothenburg, Sweden, R1-167290, XP051125813, 3rd Generation Partnership Project, Valbonne, France (Aug. 22-26, 2016).
(Continued)

*Primary Examiner* — Clemence S Han
(74) *Attorney, Agent, or Firm* — Leydig, Voit & Mayer, Ltd.

(57) ABSTRACT

A method and an apparatus for mapping a reference signal. The method includes: mapping a target-class signal to a target symbol, where the target symbol is some symbols in a first symbol set on a time-frequency resource block, the first symbol set is a set of some symbols or all symbols on the time-frequency resource block, the target-class signal has at least two functions, and the at least two functions include a function of estimating a parameter that affects signal transmission; and mapping the reference signal to a symbol in the first symbol set other than the target symbol, where the reference signal has the function of estimating a parameter that affects signal transmission.

20 Claims, 6 Drawing Sheets

(51) Int. Cl.
*H04B 7/26* (2006.01)
*H04W 72/12* (2009.01)
*H04W 28/02* (2009.01)
*H04L 5/14* (2006.01)
*H04L 27/26* (2006.01)

(52) U.S. Cl.
CPC .......... *H04L 5/0051* (2013.01); *H04L 5/0057* (2013.01); *H04L 5/14* (2013.01); *H04W 28/02* (2013.01); *H04W 72/1284* (2013.01); *H04L 27/26* (2013.01)

(56) References Cited

U.S. PATENT DOCUMENTS

| | | | | |
|---|---|---|---|---|
| 2011/0081933 | A1* | 4/2011 | Suh | G01S 5/0236 455/509 |
| 2011/0228718 | A1* | 9/2011 | Noh | H04L 5/0051 370/312 |
| 2012/0088533 | A1* | 4/2012 | Khoshnevis | H04L 1/0027 455/509 |
| 2014/0205030 | A1 | 7/2014 | Lee et al. | |
| 2016/0156441 | A1* | 6/2016 | Chae | H04J 11/003 370/336 |
| 2017/0294926 | A1* | 10/2017 | Islam | H04W 72/042 |
| 2018/0278312 | A1* | 9/2018 | Frenne | H04L 1/0023 |

FOREIGN PATENT DOCUMENTS

| | | |
|---|---|---|
| CN | 103327616 A | 9/2013 |
| CN | 104038311 A | 9/2014 |
| CN | 104904256 A | 9/2015 |
| WO | 2016000915 A1 | 1/2016 |

OTHER PUBLICATIONS

"Principles for Reference Signal Design and QCL Assumptions for NR," 3GPP TSG RAN WG1 Meeting #86, Gothenburg, Sweden, R1-167224, XP051140589, 3rd Generation Partnership Project, Valbonne, France (Aug. 22-26, 2016).

Zhang et al., "Mitigation of Phase Noise and Phase Rotation in Single-Carrier Communication Systems Using Pilots and Smoothing Technique", 2015 IEEE International Conference on Ubiquitous Wireless Broadband (ICUWB), Nov. 2015, 5 pages.

3GPP TS 36.212 V13.2.0 (Jun. 2016), 3rd Generation Partnership Project;Technical Specification Group Radio Access Network; Evolved Universal Terrestrial Radio Access (E-UTRA); Multiplexing and channel coding (Release 13), Jun. 2016, 140 pages.

* cited by examiner

METHOD AND APPARATUS FOR MAPPING REFERENCE SIGNAL

CROSS-REFERENCE TO RELATED APPLICATIONS

This application is a continuation of International Application No. PCT/CN2017/103869, filed on Sep. 28, 2017, which claims priority to Chinese Patent Application No. 201610864634.0, filed on Sep. 29, 2016, both of which are hereby incorporated by reference in their entireties.

TECHNICAL FIELD

Embodiments of the present disclosure relate to the field of communications technologies, and in particular, to a method and an apparatus for mapping a reference signal.

BACKGROUND

In a wireless communications system, when a signal is transmitted between a base station and user equipment (UE), there is a difference between a signal that is sent by a transmit end and received by a receive end and an original signal sent by the transmit end. Such a difference may be caused by phase noise of output carrier information due to non-ideality of a frequency processing device such as a local oscillator, a frequency divider, or an up-and-down converter; or may be caused by a frequency offset due to crystal oscillator instability at the transmit end and the receive end and a Doppler frequency shift in a mobile environment; or may be caused by other reasons. Currently, to resolve the foregoing problem, in the industry, a reference signal specially used for estimating a parameter that affects signal transmission is inserted in the wireless communications system for parameter estimation, and then the parameter is used to eliminate impact of the parameter on signal transmission. However, in the foregoing method, a reference signal needs to be placed on each symbol on an air interface resource, leading to a relatively large quantity of required resources, and resulting in a waste of resources.

SUMMARY

Embodiments of the present disclosure disclose a method and an apparatus for mapping a reference signal to save resources.

A first aspect discloses a method for mapping a reference signal. A target-class signal is mapped to a target symbol. The target-class signal can be used at least for phase noise estimation. The target symbol is some symbols in a first symbol set on a time-frequency resource block. The first symbol set is a set of some symbols or all symbols on the time-frequency resource block. In addition, the reference signal is mapped to a symbol in the first symbol set other than the target symbol. The target-class signal has at least two functions. The at least two functions include a function of estimating a parameter that affects signal transmission. The reference signal has the function of estimating a parameter that affects signal transmission. When the target-class signal having at least the function of estimating a parameter that affects signal transmission is mapped to a symbol, the reference signal having the function of estimating a parameter that affects signal transmission is not mapped to the symbol. As can be learned, the reference signal needs to be placed on only some symbols on an air interface resource, and does not need to be placed on all symbols on the air interface resource. Therefore, a quantity of symbols on which the reference signal is to be placed can be reduced, thereby saving resources.

In an embodiment, the target-class signal may ensure orthogonality between different antenna ports through frequency division multiplexing (FDM), or time division multiplexing (TDM), or time-frequency multiplexing, or by multiplying an orthogonal sequence in frequency domain, or by multiplying different phase offsets in frequency domain, so that the parameter that affects signal transmission can be estimated on one symbol by using the target-class signal, and signals on different antenna ports can be prevented from interfering with each other.

In an embodiment, before the target-class signal is mapped to the target symbol, the target symbol may be first determined based on a target condition. To be specific, a location of the target symbol is determined. The target condition may include at least one of the following conditions: a quantity of antenna ports used by the target-class signal; a transmission mode used by a user equipment (UE); and configuration cycle, transmission frame, and transmission symbol information of the target-class signal when the target-class signal is a periodic signal. As can be learned, the location of the target symbol can be determined based on only at least one of the foregoing three conditions, so that locations of the symbols on which the reference signal is to be placed can be determined.

In an embodiment, the reference signal may be scrambled by using a cell-specific parameter or a user-specific parameter, the cell-specific parameter may include a cell number, and the user-specific parameter may include a radio network temporary identifier (RNTI) of the UE. As can be learned, when the reference signal is a cell-specific reference signal, to be specific, when one reference signal transmission can be correctly received by all UEs in a cell, the reference signal may be scrambled by using the cell-specific parameter, or when the reference signal is a user-specific reference signal, the reference signal may be scrambled by using the user-specific parameter, so that a reference signal scrambling method can be dynamically selected based on different reference signals.

In an embodiment, when the reference signal is scrambled by using the cell-specific parameter, when the reference signal is mapped to the symbol in the first symbol set other than the target symbol, the reference signal may be mapped to a time-frequency resource element that includes N subcarriers and M symbols of symbols in the first symbol set other than the target symbol, where N and M may be integers greater than or equal to 1, so that a same reference signal can be reused by UEs in a cell, thereby saving resources.

In an embodiment, when the reference signal is scrambled by using the user-specific parameter and there is to-be-transmitted data, the reference signal is mapped to a shared time-frequency resource element different from a time-frequency resource used by the to-be-transmitted data. The time-frequency resource element may include N subcarriers and M symbols of symbols in the first symbol set other than the target symbol, and N and M are integers greater than or equal to 1, so that UEs in a cell can use a same time-frequency resource, thereby saving resources.

In an embodiment, when the reference signal is scrambled by using the user-specific parameter, the reference signal is mapped to a shared time-frequency resource block, and the reference signal is an uplink signal, the time-frequency resource block belongs a physical uplink control channel (PUCCH) resource, so that both the reference signal and a PUCCH can be transmitted on the PUCCH resource, thereby saving resources. The reference signal may be an orthogonal sequence, and a number of the orthogonal sequence is determined by a base station.

In an embodiment, when the reference signal is scrambled by using the user-specific parameter and the reference signal is mapped to a user-specific time-frequency block, when the reference signal is mapped to the symbol in the first symbol set other than the target symbol, the reference signal may be mapped to a time-frequency resource that is used for data transmission and that is allocated to the UE. A time domain location of the time-frequency resource is a symbol in the first symbol set other than the target symbol. A frequency domain location of the time-frequency resource is K subcarriers uniformly distributed on the time-frequency resource, or a subcarrier on a time-frequency resource element with a smallest number, or a subcarrier on a time-frequency resource element with a largest number. The time-frequency resource element includes N subcarriers and M symbols of symbols in the first symbol set other than the target symbol. K is determined based on a quantity of subcarriers on the time-frequency resource that is used for data transmission and that is allocated to the user equipment, K is an integer greater than 1, and N and M are integers greater than or equal to 1. As can be learned, the reference signal is mapped to a resource used for data transmission, and no additional resource is required for placing the reference signal, thereby saving resources.

In an embodiment, when the reference signal is mapped to the symbol in the first symbol set other than the target symbol, when the reference signal is scrambled by using the user-specific parameter, the reference signal is an uplink signal, and uplink data carries channel quality indicator (CQI) information, the reference signal is cascaded after the CQI information to obtain cascaded information, and the cascaded information is mapped, first in the time domain and then in the frequency domain, to a symbol in the first symbol set other than the target symbol. As can be learned, the reference signal is mapped to a resource used for data transmission, and no additional resource is required for placing the reference signal, thereby saving resources.

In an embodiment, the parameter that affects signal transmission may be phase noise or a frequency offset, or may be another parameter. When the parameter that affects signal transmission is phase noise, the reference signal may be a phase noise reference signal (PNRS).

A second aspect discloses an apparatus for mapping a reference signal. The apparatus for mapping a reference signal includes a unit used for performing the method for mapping a reference signal according to any one of the first aspect or possible implementations of the first aspect.

A third aspect discloses an apparatus for mapping a reference signal. The apparatus for mapping a reference signal includes a processor, a memory, and a transceiver. The memory is configured to store program code. The processor is configured to execute the program code. The transceiver is configured to communicate with a peer end. When the processor executes the program code stored in the memory, the processor is enabled to perform the method for mapping a reference signal according to any one of the first aspect or possible implementations of the first aspect.

A fourth aspect discloses a readable storage medium. The readable storage medium stores program code used by an apparatus for mapping a reference signal to perform the method for mapping a reference signal according to any one of the first aspect or possible implementations of the first aspect.

BRIEF DESCRIPTION OF DRAWINGS

To describe technical solutions in embodiments of the present disclosure more clearly, the following briefly describes the accompanying drawings required for the embodiments.

DESCRIPTION OF EMBODIMENTS

The following clearly and completely describes the technical solutions in the embodiments of the present disclosure with reference to the accompanying drawings in the embodiments of the present disclosure. Apparently, the described embodiments are only some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a method and an apparatus for mapping a reference signal to save resources. Details are separately described in the following.

Figure 1:
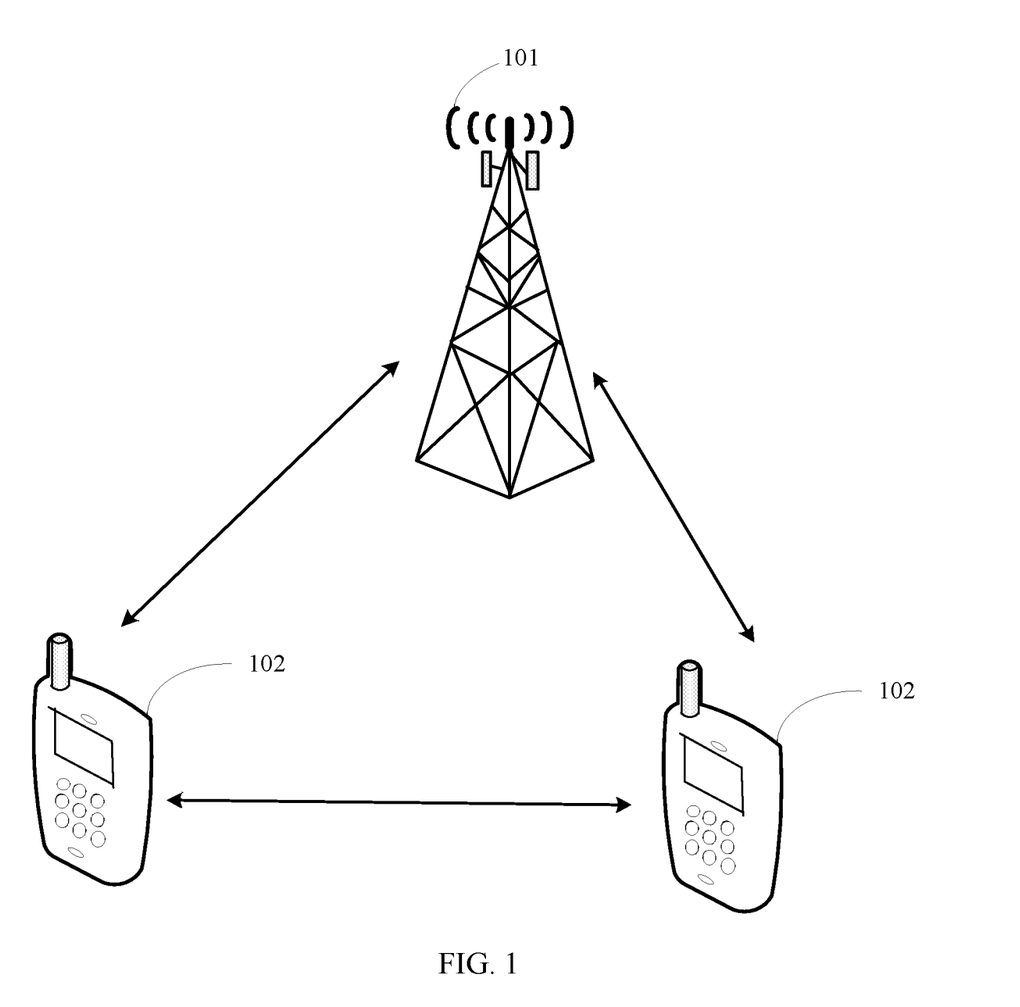
FIG. 1 is a schematic diagram of a network architecture according to an embodiment of the present disclosure.
Figure 2:
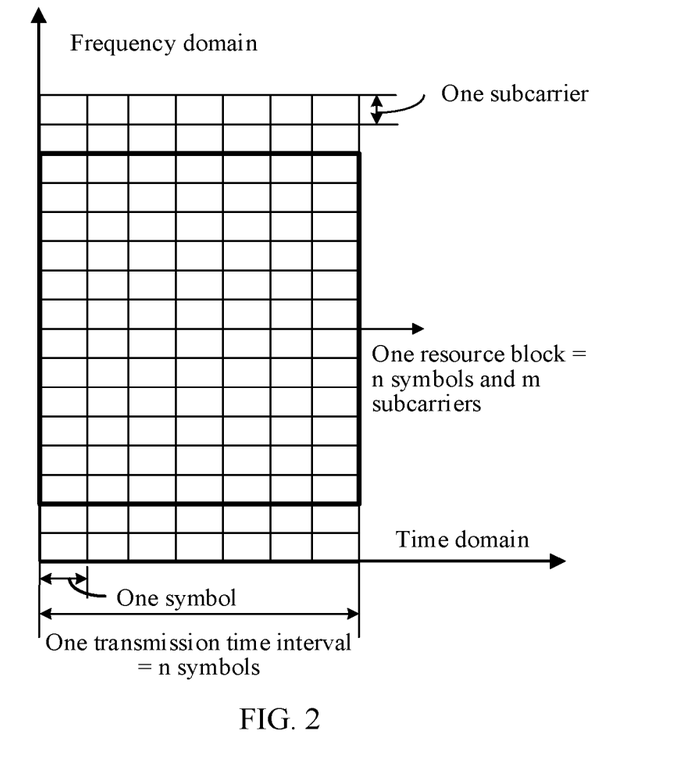
FIG. 2 is a schematic diagram of an air interface resource according to an embodiment of the present disclosure.

To better understand the method and apparatus for mapping a reference signal according to the embodiments of the present disclosure, the following first describes a network architecture used in the embodiments of the present disclosure. FIG. 1 is a schematic diagram of a network architecture according to an embodiment of the present disclosure. As shown in FIG. 1, the network architecture may include a base station 101 and at least one UE 102. Signals may be transmitted between the base station 101 and the at least one UE 102 and between the at least one UE 102 by using an air interface resource. An air interface resource is defined as a time domain resource and a frequency domain resource of an air interface, and is usually indicated by using a resource element (RE), a resource block (RB), a symbol, a subcarrier, and a transmission time interval (TTI). The air interface resource may be divided in frequency domain and time domain, and may be divided into subcarriers in frequency domain, and symbols in time domain. FIG. 2 is a schematic diagram of an air interface resource according to an embodiment of the present disclosure. As shown in FIG. 2, each grid is one RE, representing a resource of one subcarrier within one symbol time. Each RE can carry particular information. n symbols form one TTI in time. m subcarriers in one TTI are combined to form one RB.

Figure 3:
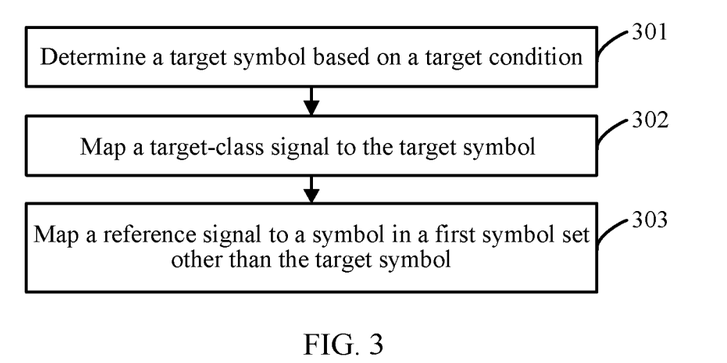
FIG. 3 is a schematic flowchart of a method for mapping a reference signal according to an embodiment of the present disclosure.

Based on the network architecture shown in FIG. 1, FIG. 3 is a schematic flowchart of a method for mapping a reference signal according to an embodiment of the present disclosure. The method for mapping a reference signal is described from a perspective of a base station 101 or UE 102. As shown in FIG. 3, the method for mapping a reference signal may include the following steps.

301. Determine a target symbol based on a target condition.

In this embodiment, before a target-class signal and a reference signal are mapped, the target symbol may be first determined based on the target condition. The target condition may include at least one of the following conditions: a quantity of antenna ports used by the target-class signal; a transmission mode used by UE; and configuration cycle, transmission frame, and transmission symbol information of the target-class signal when the target-class signal is a periodic signal. The target symbol is some symbols in a first symbol set on a time-frequency resource block, and the first symbol set is a set of some symbols or all symbols on the time-frequency resource block.

In this embodiment, the target-class signal has at least two functions. The at least two functions may include a function of estimating a parameter that affects signal transmission. In other words, in addition to being used for estimating a parameter that affects signal transmission, the target-class signal further has another function. For example, in Long Term Evolution (LTE), the target-class signal may be a cell-specific reference signal (CRS), a demodulation reference signal DMRS) (that is, a UE-specific reference signal), a channel state information-reference signal (CSI-RS), a multimedia broadcast multicast service single frequency network reference signal (MBSFN-RS), a positioning reference signal, a sounding reference signal, or another signal.

Figure 4:
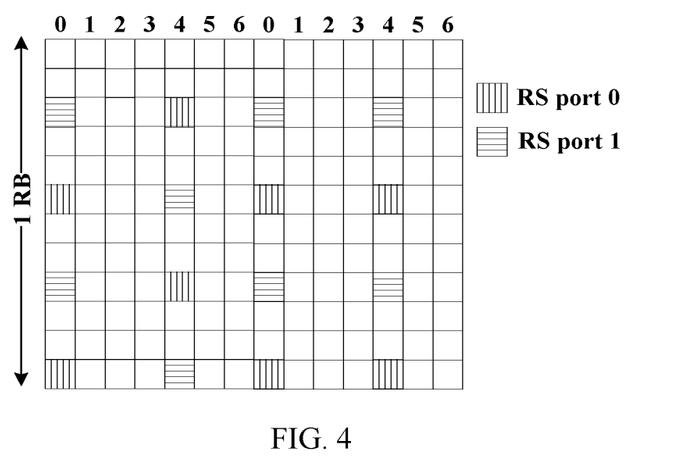
FIG. 4 is a schematic diagram of a time-frequency resource location to which a CRS is mapped when the CRS uses two antenna ports according to an embodiment of the present disclosure.
Figure 5:
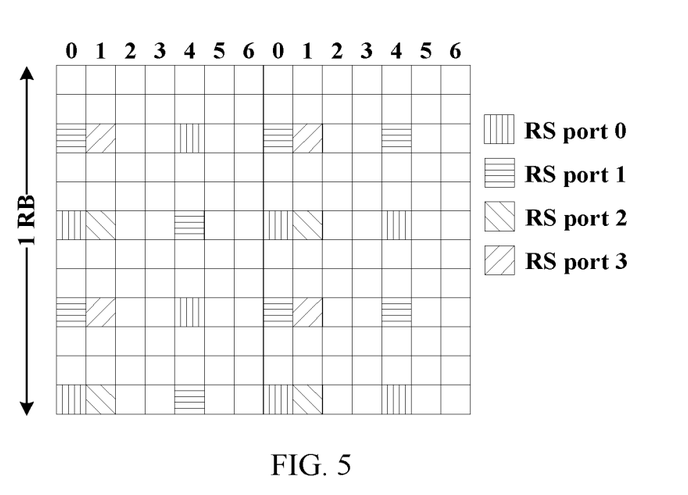
FIG. 5 is a schematic diagram of a time-frequency resource location to which a CRS is mapped when the CRS uses four antenna ports according to an embodiment of the present disclosure.

In this embodiment, the target-class signal uses different quantities of antenna ports, and the target-class signal may be mapped to different quantities of symbols. For example, when the target-class signal is a CRS, a quantity of antenna ports that may be used is 1, 2, or 4. FIG. 4 is a schematic diagram of a time-frequency resource location to which a CRS is mapped when the CRS uses two antenna ports according to an embodiment of the present disclosure. As shown in FIG. 4, when the CRS uses two antenna ports, the CRS may be mapped to four symbols in one subframe. FIG. 5 is a schematic diagram of a time-frequency resource location to which a CRS is mapped when the CRS uses four antenna ports according to an embodiment of the present disclosure. As shown in FIG. 5, when the CRS uses four antenna ports, the CRS may be mapped to six symbols in one subframe.

Figure 6:
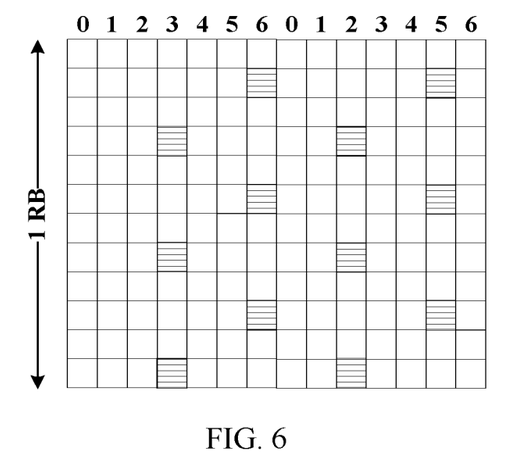
FIG. 6 is a schematic diagram of a time-frequency resource location to which a target-class signal is mapped when UE uses a transmission mode 7 according to an embodiment of the present disclosure.
Figure 7:
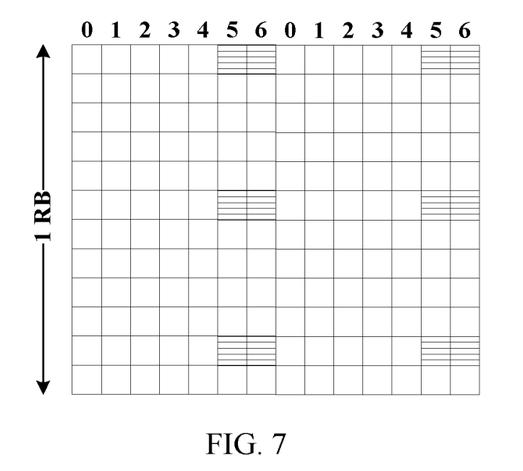
FIG. 7 is a schematic diagram of a time-frequency resource location to which a target-class signal is mapped when UE uses a transmission mode 8 according to an embodiment of the present disclosure.

In this embodiment, UE uses different transmission modes, and the target-class signal may be mapped to different quantities of symbols at different locations. For example, FIG. 6 is a schematic diagram of a time-frequency resource location to which a target-class signal is mapped when UE uses a transmission mode 7 according to an embodiment of the present disclosure. As shown in FIG. 6, when the UE uses the transmission mode 7, the target-class signal is mapped to symbols 4, 7, 10, and 13. FIG. 7 is a schematic diagram of a time-frequency resource location to which a target-class signal is mapped when UE uses a transmission mode 8 according to an embodiment of the present disclosure. As shown in FIG. 7, when the UE uses the transmission mode 8, the target-class signal is mapped to symbols 6, 7, 13, and 14.

In this embodiment, when the target-class signal is a periodic signal, and when the target-class signal has different configuration cycle, transmission frame, and transmission symbol information, the target-class signal may be mapped to different quantities of symbols at different locations. For example, when the target-class signal is a CSI-RS, if the CSI-RS is a periodic signal, a symbol on which the CSI-RS is to be periodically sent and a subframe to which the symbol belongs may be determined by configuring a sending period and an offset within a subframe.

Figure 8:
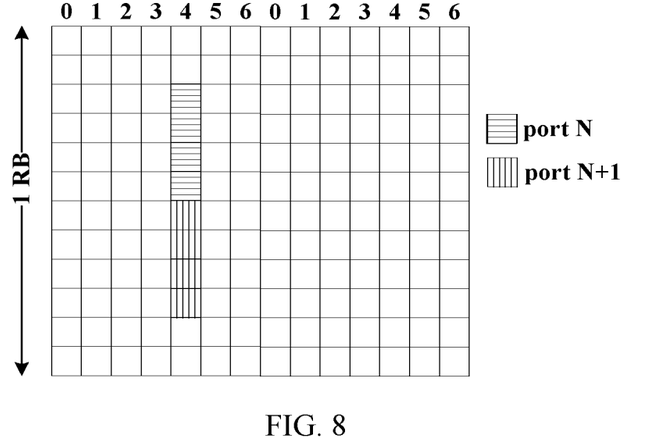
FIG. 8 is a schematic diagram of ensuring orthogonality between different antenna ports through FDM according to an embodiment of the present disclosure.
Figure 9:
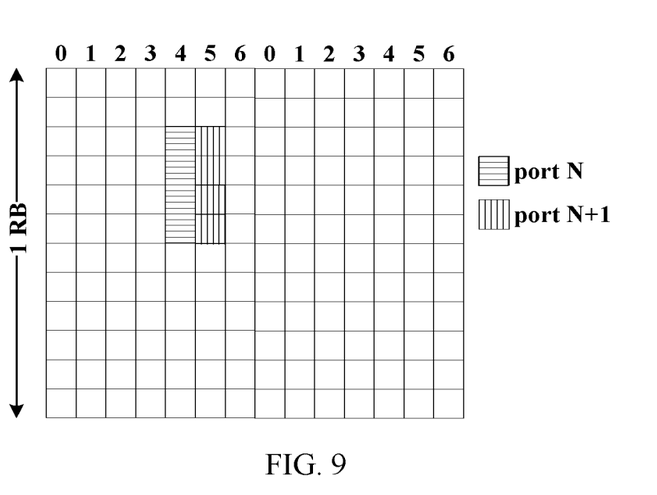
FIG. 9 is a schematic diagram of ensuring orthogonality between different antenna ports through TDM according to an embodiment of the present disclosure.
Figure 10:
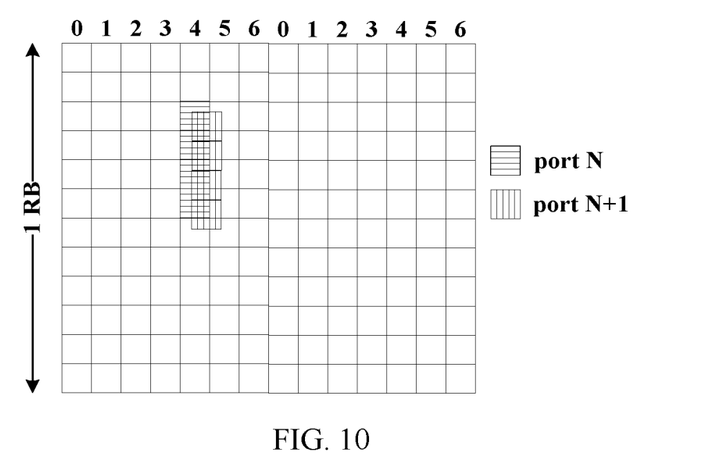
FIG. 10 is a schematic diagram of ensuring orthogonality between different antenna ports through frequency domain CDM according to an embodiment of the present disclosure.

In this embodiment, the target-class signal may ensure orthogonality between different antenna ports through FDM, or TDM, or time-frequency multiplexing, or by multiplying an orthogonal sequence in frequency domain, or by multiplying different phase offsets in frequency domain, or in other manners, so that signals on different antenna ports can be prevented from interfering with each other. FIG. 8 is a schematic diagram of ensuring orthogonality between different antenna ports through FDM according to an embodiment of the present disclosure. As shown in FIG. 8, when the target-class signal ensures orthogonality between different antenna ports through FDM, pilot frequencies of the different antenna ports use different frequency domain resources. FIG. 9 is a schematic diagram of ensuring orthogonality between different antenna ports through TDM according to an embodiment of the present disclosure. As shown in FIG. 9, when the target-class signal ensures orthogonality between different antenna ports through TDM, pilot frequencies of the different antenna ports use different time domain resources, a pilot frequency of port N is mapped to symbol 4, and a pilot frequency of port N+1 is mapped to symbol 5. FIG. 10 is a schematic diagram of ensuring orthogonality between different antenna ports by multiplying an orthogonal sequence in frequency domain according to an embodiment of the present disclosure. As shown in FIG. 10, pilot frequencies on port N and port N+1 are mapped to a same time-frequency resource location, and port N and port N+1 achieves orthogonality between each other by multiplying an orthogonal code in frequency domain.

302. Map a target-class signal to the target symbol.

In this embodiment, after the target symbol is determined based on the target condition, the target-class signal may be mapped to the target symbol. The target-class signal is mapped to the target symbol not because the target-class signal has the function of estimating a parameter that affects signal transmission but because the target-class signal has another function and the target-class signal needs to be mapped to the target symbol to implement the another function. In this embodiment, in addition to the another function, the target-class signal further has the function of estimating a parameter that affects signal transmission. Therefore, the function of estimating a parameter that affects signal transmission of the target-class signal may be reused. In this way, no additional reference signal needs to be placed on a target-class symbol, so that a quantity of symbols on which the reference signal is to be placed can be reduced, thereby saving time-frequency resources.

303. Map a reference signal to a symbol in a first symbol set other than the target symbol.

In this embodiment, after the target symbol is determined based on the target condition, the reference signal may be mapped to the symbol in the first symbol set other than the target symbol. Step 303 and step 302 may be performed at the same time or sequentially. The reference signal has the function of estimating a parameter that affects signal transmission. The parameter that affects signal transmission may be phase noise, or may be a frequency offset, or may be another parameter. This is not limited in this embodiment. When the parameter that affects signal transmission is phase noise, the reference signal may be a PNRS, or may be used for phase noise estimation. The reference signal is different from the target-class signal.

In this embodiment, the symbol in the first symbol set other than the target symbol may be a symbol on a shared time-frequency resource (for example, UEs belonging to a same cell may use a same time-frequency resource to receive or send a reference signal) or a symbol on a UE-specific time-frequency resource (for example, different UEs belonging to a same cell use different time-frequency resources to receive or send a reference signal). In other words, the reference signal may be mapped to a shared time-frequency resource or a UE-specific time-frequency resource. When the reference signal is scrambled using a cell-specific parameter, the reference signal is mapped to a shared time-frequency resource, and the cell-specific parameter may include a cell number. When the reference signal is scrambled using a user-specific parameter, the reference signal may be mapped to a UE-specific time-frequency resource or a shared time-frequency resource, and the user-specific parameter may include an RNTI of the UE. When the reference signal is scrambled by using a user-specific parameter and mapped to a shared time-frequency resource, and the reference signal is an uplink signal, the time-frequency resource block may belong to a physical uplink control channel resource. A reference signal sequence may be mapped to a time-frequency resource location that is on the physical uplink control channel resource and at which the reference signal is not placed. On one symbol, the reference signal sequence is an orthogonal sequence, may be a ZC sequence, or may be a Walsh sequence. A base station may notify the UE of a number of a used orthogonal sequence by using a downlink control message. For example, for a ZC sequence, a phase offset of the ZC sequence is notified; for a Walsh sequence, a number of the Walsh sequence is notified. For example, Table 1 is a Walsh sequence with a length of 8. A PNRS uses the Walsh sequence with the length of 8 in one sequence. The base station is to notify the UE of a number of the used Walsh sequence.

TABLE 1

| Walsh sequence with a length of 8 | |
|---|---|
| Number of a Walsh sequence | Walsh code |
| 1 | 1, 1, 1, 1, 1, 1, 1, 1 |
| 2 | 1, 1, −1, −1, 1, 1, −1, −1 |
| 3 | 1, −1, 1, −1, 1, −1, 1, −1 |

TABLE 1-continued

| Walsh sequence with a length of 8 | |
|---|---|
| Number of a Walsh sequence | Walsh code |
| 4 | 1, −1, −1, 1, 1, −1, −1, 1 |
| 5 | 1, 1, 1, 1, −1, −1, −1, −1 |
| 6 | 1, 1, −1, −1, −1, −1, 1, 1 |
| 7 | 1, −1, 1, −1, −1, 1, −1, 1 |
| 8 | 1, −1, −1, 1, −1, 1, 1, −1 |

In this embodiment, the reference signal may be mapped to a time-frequency resource element when the reference signal is scrambled by using the cell-specific parameter, where the time-frequency resource element may include N subcarriers and M symbols of symbols in the first symbol set other than the target symbol, and N and M are integers greater than or equal to 1.

In this embodiment, when the reference signal is scrambled using the user-specific parameter and there is to-be-transmitted data, the reference signal is mapped to a time-frequency resource element different from a time-frequency resource used by the to-be-transmitted data.

In this embodiment, when the reference signal is scrambled using the user-specific parameter, the reference signal may be mapped to a time-frequency resource that is used for data transmission and that is allocated to the UE, where a time domain location of the time-frequency resource is a symbol in the first symbol set other than the target symbol, and a frequency domain location of the time-frequency resource may be K subcarriers uniformly distributed on the time-frequency resource, or a subcarrier on a time-frequency resource element with a smallest number, or a subcarrier on a time-frequency resource element with a largest number. K is determined based on a quantity of subcarriers on the time-frequency resource that is used for data transmission and that is allocated to the user equipment. K is an integer greater than 1. For example, when the quantity of subcarriers on the time-frequency resource that is used for data transmission is less than a first preset value, K=2. When the quantity of subcarriers on the time-frequency resource that is used for data transmission is greater than or equal to the first preset value and less than a second preset value, K=4. When the quantity of subcarriers on the time-frequency resource that is used for data transmission is greater than or equal to the second preset value, K=6.

In this embodiment, when the reference signal is scrambled using the user-specific parameter, the reference signal is an uplink signal, and uplink data carries CQI information, the reference signal is cascaded after the CQI information to obtain cascaded information, and the cascaded information is mapped, first in the time domain and then in the frequency domain, to a symbol in the first symbol set other than the target symbol. The mapping is started from a lowest frequency domain location allocated to the UE and is not performed at a location of a DMRS.

In the method for mapping a reference signal described in FIG. 3, the target symbol is determined based on the target condition, the target-class signal is mapped to the target symbol in the first symbol set, and the reference signal is mapped to the symbol in the first symbol set other than the target symbol. When the target-class signal having at least the function of estimating a parameter that affects signal transmission is mapped to a symbol, the reference signal having the function of estimating a parameter that affects signal transmission is not mapped to the symbol. As can be learned, the reference signal needs to be placed on only some symbols on an air interface resource, and does not need to be placed on all symbols on the air interface resource. Therefore, a quantity of symbols on which the reference signal is to be placed can be reduced, thereby saving resources.

Figure 11:
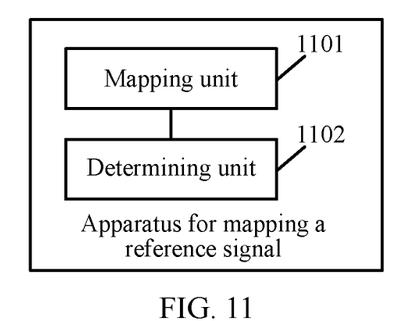
FIG. 11 is a schematic structural diagram of an apparatus for mapping a reference signal according to an embodiment of the present disclosure.

Based on the network architecture shown in FIG. 1, FIG. 11 is a schematic structural diagram of an apparatus for mapping a reference signal according to an embodiment of the present disclosure. The apparatus for mapping a reference signal may be the base station 101 or the UE 102. As shown in FIG. 11, the apparatus for mapping a reference signal may include:

a mapping unit 1101, configured to map a target-class signal to a target symbol, where the target symbol is some symbols in a first symbol set on a time-frequency resource block, the first symbol set is a set of some symbols or all symbols on the time-frequency resource block, the target-class signal has at least two functions, and the at least two functions include a function of estimating a parameter that affects signal transmission, where the mapping unit 1101 is further configured to map the reference signal to a symbol in the first symbol set other than the target symbol, where the reference signal has the function of estimating a parameter that affects signal transmission.

In a possible implementation, the target-class signal may ensure orthogonality between different antenna ports through FDM, or TDM, or time-frequency multiplexing, or by multiplying an orthogonal sequence in frequency domain, or by multiplying different phase offsets in frequency domain.

In a possible implementation, the reference signal apparatus may further include:

a determining unit 1102, configured to determine the target symbol based on a target condition, where the target condition may include at least one of the following conditions:

a quantity of antenna ports used by the target-class signal;

a transmission mode used by UE; and configuration cycle, transmission frame, and transmission symbol information of the target-class signal when the target-class signal is a periodic signal.

Specifically, the mapping unit 1101 is configured to map the target-class signal to the target symbol determined by the determining unit 1102.

In a possible implementation, the reference signal may be scrambled by using a cell-specific parameter or a user-specific parameter, the cell-specific parameter includes a cell number, and the user-specific parameter includes an RNTI of the UE.

In a possible implementation, that the mapping unit 1101 maps the reference signal to the symbol in the first symbol set other than the target symbol includes:

mapping the reference signal to a time-frequency resource element when the reference signal is scrambled by using the cell-specific parameter, where the time-frequency resource element may include N subcarriers and M symbols of symbols in the first symbol set other than the target symbol, and N and M are integers greater than or equal to 1.

In a possible implementation, that the mapping unit 1101 maps the reference signal to the symbol in the first symbol set other than the target symbol includes:

when the reference signal is scrambled by using the user-specific parameter and there is to-be-transmitted data, mapping the reference signal to a time-frequency resource element different from a time-frequency resource used by the to-be-transmitted data, where the time-frequency resource element may include N subcarriers and M symbols of symbols in the first symbol set other than the target symbol, and N and M are integers greater than or equal to 1.

In a possible implementation, when the reference signal is scrambled by using the user-specific parameter and the reference signal is an uplink signal, the time-frequency resource block belongs to a physical uplink control channel resource, the reference signal is an orthogonal sequence, and a number of the orthogonal sequence is determined by a base station.

In a possible implementation, when the reference signal is scrambled by using the user-specific parameter, that the mapping unit 1101 maps the reference signal to the symbol in the first symbol set other than the target symbol includes:

mapping the reference signal to a time-frequency resource that is used for data transmission and that is allocated to the UE, where a time domain location of the time-frequency resource is a symbol in the first symbol set other than the target symbol, and a frequency domain location of the time-frequency resource is K subcarriers uniformly distributed on the time-frequency resource, or a subcarrier on a time-frequency resource element with a smallest number, or a subcarrier on a time-frequency resource element with a largest number, where the time-frequency resource element includes N subcarriers and M symbols of symbols in the first symbol set other than the target symbol, K is determined based on a quantity of subcarriers on the time-frequency resource that is used for data transmission and that is allocated to the UE, K is an integer greater than 1, and N and M are integers greater than or equal to 1.

In a possible implementation, that the mapping unit 1101 maps the reference signal to the symbol in the first symbol set other than the target symbol includes:

when the reference signal is scrambled by using the user-specific parameter, the reference signal is an uplink signal, and uplink data carries CQI information, cascading the reference signal after the CQI information to obtain cascaded information; and mapping, first in the time domain and then in the frequency domain, the cascaded information to a symbol in the first symbol set other than the target symbol.

In a possible implementation, the parameter that affects signal transmission may be phase noise or a frequency offset; and when the parameter that affects signal transmission is phase noise, the reference signal may be a PNRS.

In the apparatus for mapping a reference signal described in FIG. 11, the target symbol is determined based on the target condition, the target-class signal is mapped to the target symbol in the first symbol set, and the reference signal is mapped to a symbol in the first symbol set other than the target symbol. When the target-class signal having at least the function of estimating a parameter that affects signal transmission is mapped to a symbol, the reference signal having the function of estimating a parameter that affects signal transmission is not mapped to the symbol. As can be learned, the reference signal needs to be placed on only some symbols on an air interface resource, and does not need to be placed on all symbols on the air interface resource. Therefore, a quantity of symbols on which the reference signal is to be placed can be reduced, thereby saving resources.

Figure 12:
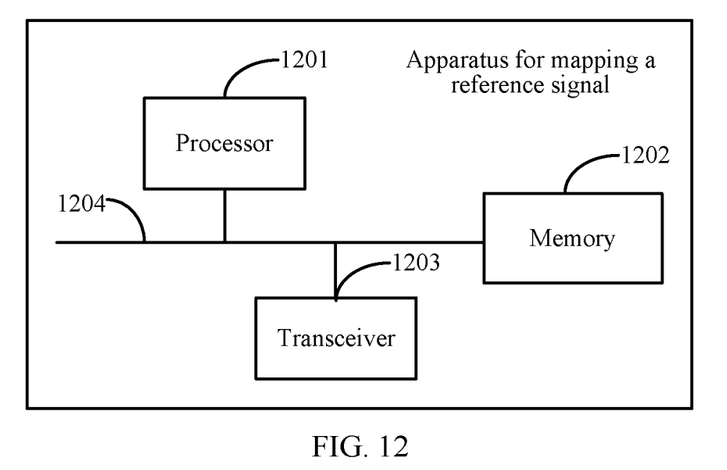
FIG. 12 is a schematic structural diagram of another apparatus for mapping a reference signal according to an embodiment of the present disclosure.

Based on the network architecture shown in FIG. 1, FIG. 12 is a schematic structural diagram of another apparatus for mapping a reference signal according to an embodiment of the present disclosure. The apparatus for mapping a reference signal may be the base station 101 or the UE 102. As shown in FIG. 12, the apparatus for mapping a reference signal may include: a processor 1201, a memory 1202, a transceiver 1203, and a bus 1204.

The bus 1204 is configured to implement connection between these components.

The memory 1202 stores a set of program code. The processor 1201 is configured to invoke the program code stored in the memory 1202, to perform the following operations:

mapping a target-class signal to a target symbol, where the target symbol is some symbols in a first symbol set on a time-frequency resource block, the first symbol set is a set of some symbols or all symbols on the time-frequency resource block, the target-class signal has at least two functions, and the at least two functions include a function of estimating a parameter that affects signal transmission; and mapping the reference signal to a symbol in the first symbol set other than the target symbol, where the reference signal has the function of estimating a parameter that affects signal transmission.

In a possible implementation, the target-class signal may ensure orthogonality between different antenna ports through frequency division multiplexing FDM, or time division multiplexing TDM, or time-frequency multiplexing, or by multiplying an orthogonal sequence in frequency domain, or by multiplying different phase offsets in frequency domain.

In a possible implementation, before mapping the target-class signal to the target symbol, the processor 1201 is further configured to invoke the program code stored in the memory 1202, to perform the following operations:

determining the target symbol based on a target condition, where the target condition may include at least one of the following conditions:

a quantity of antenna ports used by the target-class signal;

a transmission mode used by UE; and configuration cycle, transmission frame, and transmission symbol information of the target-class signal when the target-class signal is a periodic signal.

In a possible implementation, the reference signal may be scrambled by using a cell-specific parameter or a user-specific parameter, the cell-specific parameter may include a cell number, and the user-specific parameter may include an RNTI of the UE.

In a possible implementation, that the processor 1201 maps the reference signal to the symbol in the first symbol set other than the target symbol includes:

mapping the reference signal to a time-frequency resource element when the reference signal is scrambled by using the cell-specific parameter, where the time-frequency resource element includes N subcarriers and M symbols of symbols in the first symbol set other than the target symbol, and N and M are integers greater than or equal to 1.

In a possible implementation, that the processor 1201 maps the reference signal to the symbol in the first symbol set other than the target symbol includes:

when the reference signal is scrambled by using the user-specific parameter and there is to-be-transmitted data, mapping the reference signal to a time-frequency resource element different from a time-frequency resource used by the to-be-transmitted data, where the time-frequency resource element may include N subcarriers and M symbols of symbols in the first symbol set other than the target symbol, and N and M are integers greater than or equal to 1.

In a possible implementation, when the reference signal is scrambled by using the user-specific parameter and the reference signal is an uplink signal, the time-frequency resource block belongs to a physical uplink control channel resource, the reference signal is an orthogonal sequence, and a number of the orthogonal sequence is determined by a base station.

In a possible implementation, when the reference signal is scrambled by using the user-specific parameter, that the processor 1201 maps the reference signal to the symbol in the first symbol set other than the target symbol includes:

mapping the reference signal to a time-frequency resource that is used for data transmission and that is allocated to the UE, where a time domain location of the time-frequency resource is a symbol in the first symbol set other than the target symbol, and a frequency domain location of the time-frequency resource is K subcarriers uniformly distributed on the time-frequency resource, or a subcarrier on a time-frequency resource element with a smallest number, or a subcarrier on a time-frequency resource element with a largest number, where the time-frequency resource element includes N subcarriers and M symbols of symbols in the first symbol set other than the target symbol, K is determined based on a quantity of subcarriers on the time-frequency resource that is used for data transmission and that is allocated to the user equipment, K is an integer greater than 1, and N and M are integers greater than or equal to 1.

In a possible implementation, that the processor 1201 maps the reference signal to the symbol in the first symbol set other than the target symbol includes:

when the reference signal is scrambled by using the user-specific parameter, the reference signal is an uplink signal, and uplink data carries CQI information, cascading the reference signal after the CQI information to obtain cascaded information; and mapping, first in the time domain and then in the frequency domain, the cascaded information to a symbol in the first symbol set other than the target symbol.

In a possible implementation, the parameter that affects signal transmission may be phase noise or a frequency offset; and when the parameter that affects signal transmission is phase noise, the reference signal may be a PNRS.

In a possible implementation, the transceiver 1203 is configured to send the target-class signal and the reference signal to a peer end by using a video resource.

In the apparatus for mapping a reference signal described in FIG. 12, the target symbol is determined based on the target condition, the target-class signal is mapped to the target symbol in the first symbol set, and the reference signal is mapped to a symbol in the first symbol set other than the target symbol. When the target-class signal having at least the function of estimating a parameter that affects signal transmission is mapped to a symbol, the reference signal having the function of estimating a parameter that affects signal transmission is not mapped to the symbol. As can be learned, the reference signal needs to be placed on only some symbols on an air interface resource, and does not need to be placed on all symbols on the air interface resource. Therefore, a quantity of symbols on which the reference signal is to be placed can be reduced, thereby saving resources.

An embodiment of the present disclosure further discloses a readable storage medium. The readable storage medium stores program code used by an apparatus for mapping a reference signal to perform the method for mapping a reference signal shown in FIG. 3.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disk, or the like.

Although the present disclosure is described with reference to the embodiments, in a process of implementing the present disclosure that claims protection, a person skilled in the art may understand and implement other variations of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. The fact that some measures are recited in mutually different dependent claims does not indicate that a combination of these measures cannot bring better effects.

What is claimed is:

1. A method for mapping a reference signal, comprising:
    mapping a target-class signal to a target symbol, wherein the target symbol includes a subset of symbols in a first symbol set on a time-frequency resource block, the first symbol set is a set of some symbols or all symbols on the time-frequency resource block, the target-class signal has at least two functions, and the at least two functions comprise a function of estimating a parameter that affects signal transmission; and
    mapping the reference signal to a symbol in the first symbol set other than the target symbol, wherein the reference signal has the function of estimating a parameter that affects signal transmission,
    wherein the reference signal is not mapped to a symbol in response to the target-class signal having at least the function of estimating a parameter that affects signal transmission being mapped to the symbol.

2. The method according to claim 1, wherein the target-class signal ensures orthogonality between different antenna ports through frequency division multiplexing (FDM), or time division multiplexing (TDM), or time-frequency multiplexing, or by multiplying an orthogonal sequence in a frequency domain, or by multiplying different phase offsets in the frequency domain.

3. The method according to claim 1, wherein before the mapping a target-class signal to a target symbol, the method further comprises:
    determining the target symbol based on a target condition, wherein
    the target condition comprises at least one of the following conditions:
        a quantity of antenna ports used by the target-class signal;
        a transmission mode used by a user equipment; and
        a configuration cycle, transmission frame, and transmission symbol information of the target-class signal in response to the target-class signal being a periodic signal.

4. The method according to claim 1, wherein the reference signal is scrambled using a cell-specific parameter or a user-specific parameter, the cell-specific parameter comprises a cell number, and the user-specific parameter comprises a radio network temporary identifier (RNTI) of a user equipment.

5. The method according to claim 4, wherein the mapping the reference signal to a symbol in the first symbol set other than the target symbol comprises:
    mapping the reference signal to a time-frequency resource element in response to the reference signal being scrambled using the cell-specific parameter, wherein the time-frequency resource element comprises N subcarriers and M symbols of the symbols in the first symbol set other than the target symbol, and N and M are integers greater than or equal to 1.

6. The method according to claim 4, wherein the mapping the reference signal to a symbol in the first symbol set other than the target symbol comprises:
    in response to the reference signal being scrambled using the user-specific parameter and there being to-be-transmitted data, mapping the reference signal to a time-frequency resource element different from a time-frequency resource used by the to-be-transmitted data, wherein the time-frequency resource element comprises N subcarriers and M symbols of the symbols in the first symbol set other than the target symbol, and N and M are integers greater than or equal to 1.

7. The method according to claim 4, wherein in response to the reference signal being scrambled using the user-specific parameter and the reference signal being an uplink signal, the time-frequency resource block belongs to a physical uplink control channel resource, the reference signal is an orthogonal sequence, and a number of the orthogonal sequence is determined by a base station.

8. The method according to claim 4, wherein in response to the reference signal being scrambled using the user-specific parameter, the mapping the reference signal to a symbol in the first symbol set other than the target symbol comprises:
    mapping the reference signal to a time-frequency resource that is used for data transmission and that is allocated to the user equipment, wherein a time domain location of the time-frequency resource is a symbol in the first symbol set other than the target symbol, and a frequency domain location of the time-frequency resource is K subcarriers uniformly distributed on the time-frequency resource, or a subcarrier on the time-frequency resource element with a smallest number, or a subcarrier on the time-frequency resource element with a largest number, wherein the time-frequency resource element comprises N subcarriers and M symbols of the symbols in the first symbol set other than the target symbol, K is determined based on a quantity of subcarriers on the time-frequency resource that is used for data transmission and that is allocated to the user equipment, K is an integer greater than 1, and N and M are integers greater than or equal to 1.

9. The method according to claim 4, wherein the mapping the reference signal to a symbol in the first symbol set other than the target symbol comprises:
    in response to the reference signal being scrambled using the user-specific parameter, the reference signal being an uplink signal, and uplink data carrying channel quality indicator (CQI) information, cascading the reference signal after the CQI information to obtain cascaded information; and
    mapping, first in the time domain and then in the frequency domain, the cascaded information to a symbol in the first symbol set other than the target symbol.

10. The method according to claim 1, wherein the parameter that affects signal transmission is a phase noise; and the reference signal is a phase noise reference signal (PNRS).

11. An apparatus for mapping a reference signal, comprising:

a memory storing program code; and a processor configured to invoke the program code stored in the memory to map a target-class signal to a target symbol, wherein the target symbol includes a subset of symbols in a first symbol set on a time-frequency resource block, the first symbol set is a set of some symbols or all symbols on the time-frequency resource block, the target-class signal has at least two functions, and the at least two functions comprise a function of estimating a parameter that affects signal transmission, wherein the processor is further configured to invoke the program code stored in the memory to map the reference signal to a symbol in the first symbol set other than the target symbol, wherein the reference signal has the function of estimating a parameter that affects signal transmission, wherein the reference signal is not mapped to a symbol in response to the target-class signal having at least the function of estimating a parameter that affects signal transmission being mapped to the symbol.

12. The apparatus according to claim 11, wherein the target-class signal ensures orthogonality between different antenna ports through frequency division multiplexing (FDM), or time division multiplexing (TDM), or time-frequency multiplexing, or by multiplying an orthogonal sequence in a frequency domain, or by multiplying different phase offsets in the frequency domain.

13. The apparatus according to claim 11, wherein the processor is further configured to invoke the program code stored in the memory to determine the target symbol based on a target condition, wherein the target condition comprises at least one of the following conditions:

a quantity of antenna ports used by the target-class signal;

a transmission mode used by user equipment; and a configuration cycle, transmission frame, and transmission symbol information of the target-class signal in response to the target-class signal being a periodic signal.

14. The apparatus according to claim 11, wherein the reference signal is scrambled using a cell-specific parameter or a user-specific parameter, the cell-specific parameter comprises a cell number, and the user-specific parameter comprises a radio network temporary identifier (RNTI) of a user equipment.

15. The apparatus according to claim 14, wherein that the processor is configured to invoke the program code stored in the memory to the reference signal to the symbol in the first symbol set other than the target symbol comprises:

the processor is configured to invoke the program code stored in the memory to map the reference signal to a time-frequency resource element in response to the reference signal is being scrambled by using the cell-specific parameter, wherein the time-frequency resource element comprises N subcarriers and M symbols of symbols in the first symbol set other than the target symbol, and N and M are integers greater than or equal to 1.

16. The apparatus according to claim 14, wherein that the processor is configured to invoke the program code stored in the memory to the reference signal to the symbol in the first symbol set other than the target symbol comprises:

the processor is configured to invoke the program code stored in the memory to, in response to the reference signal being scrambled using the user-specific parameter and there being to-be-transmitted data, map the reference signal to a time-frequency resource element different from a time-frequency resource used by the to-be-transmitted data, wherein the time-frequency resource element comprises N subcarriers and M symbols of symbols in the first symbol set other than the target symbol, and N and M are integers greater than or equal to 1.

17. The apparatus according to claim 14, wherein in response to the reference signal being scrambled using the user-specific parameter and the reference signal being an uplink signal, the time-frequency resource block belongs to a physical uplink control channel resource, the reference signal is an orthogonal sequence, and a number of the orthogonal sequence is determined by a base station.

18. The apparatus according to claim 14, wherein in response to the reference signal being scrambled using the user-specific parameter, that the processor is configured to invoke the program code stored in the memory to map the reference signal to the symbol in the first symbol set other than the target symbol comprises:

the processor is configured to invoke the program code stored in the memory to map the reference signal to a time-frequency resource that is used for data transmission and that is allocated to the user equipment, wherein a time domain location of the time-frequency resource is a symbol in the first symbol set other than the target symbol, and a frequency domain location of the time-frequency resource is K subcarriers uniformly distributed on the time-frequency resource, or a subcarrier on the time-frequency resource element with a smallest number, or a subcarrier on the time-frequency resource element with a largest number, wherein the time-frequency resource element comprises N subcarriers and M symbols of symbols in the first symbol set other than the target symbol, K is determined based on a quantity of subcarriers on the time-frequency resource that is used for data transmission and that is allocated to the user equipment, K is an integer greater than 1, and N and M are integers greater than or equal to 1.

19. The apparatus according to claim 14, wherein that the processor is configured to invoke the program code stored in the memory to map the reference signal to the symbol in the first symbol set other than the target symbol comprises:

the processor is configured to invoke the program code stored in the memory to, in response to the reference signal being scrambled using the user-specific parameter, the reference signal being an uplink signal, and uplink data carrying channel quality indicator (CQI) information, cascading the reference signal after the CQI information to obtain cascaded information; and map, first in the time domain and then in the frequency domain, the cascaded information to a symbol in the first symbol set other than the target symbol.

20. The apparatus according to claim 11, wherein the parameter that affects signal transmission is a phase noise; and the reference signal is a phase noise reference signal (PNRS).

* * * * *